US008793605B2

(12) United States Patent
Szeto

(10) Patent No.: US 8,793,605 B2
(45) Date of Patent: Jul. 29, 2014

(54) SMART DRAG-AND-DROP

(75) Inventor: Christopher T. Szeto, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 621 days.

(21) Appl. No.: 11/393,198

(22) Filed: Mar. 29, 2006

(65) Prior Publication Data
US 2007/0234226 A1 Oct. 4, 2007

(51) Int. Cl.
G06F 3/048 (2013.01)
G06F 3/0481 (2013.01)

(52) U.S. Cl.
CPC .................................. G06F 3/0481 (2013.01)
USPC ........................... 715/769; 715/764; 715/770

(58) Field of Classification Search
USPC .......................................... 715/769, 770, 764
See application file for complete search history.

(56) References Cited

U.S. PATENT DOCUMENTS

| 5,638,504 | A | * | 6/1997 | Scott et al. | 715/202 |
|---|---|---|---|---|---|
| 5,638,505 | A | * | 6/1997 | Hemenway et al. | 715/769 |
| 5,740,389 | A | * | 4/1998 | Li et al. | 715/769 |
| 5,742,286 | A | * | 4/1998 | Kung et al. | 715/839 |
| 5,745,111 | A | * | 4/1998 | Cline et al. | 715/769 |
| 5,745,112 | A | * | 4/1998 | Hirose | 715/769 |
| 5,760,773 | A | * | 6/1998 | Berman et al. | 715/808 |
| 5,774,119 | A | * | 6/1998 | Alimpich et al. | 715/764 |
| 5,786,805 | A | * | 7/1998 | Barry | 345/159 |
| 6,259,448 | B1 | * | 7/2001 | McNally et al. | 715/733 |
| 6,393,429 | B1 | * | 5/2002 | Yagi et al. | 707/102 |
| 6,572,660 | B1 | * | 6/2003 | Okamoto | 715/272 |
| 6,803,929 | B2 | * | 10/2004 | Hinegardner et al. | 715/769 |
| 7,055,105 | B2 | * | 5/2006 | Windl et al. | 715/769 |
| 7,231,609 | B2 | * | 6/2007 | Baudisch | 715/769 |
| 7,296,025 | B2 | * | 11/2007 | Kung et al. | 707/10 |
| 7,739,604 | B1 | * | 6/2010 | Lyons et al. | 715/736 |
| 7,783,985 | B2 | * | 8/2010 | Indiran et al. | 715/769 |
| 2001/0024212 | A1 | * | 9/2001 | Ohnishi | 345/769 |
| 2002/0080180 | A1 | * | 6/2002 | Mander et al. | 345/769 |
| 2002/0196271 | A1 | * | 12/2002 | Windl et al. | 345/734 |
| 2003/0160825 | A1 | * | 8/2003 | Weber | 345/769 |
| 2003/0184587 | A1 | * | 10/2003 | Ording et al. | 345/769 |
| 2003/0208639 | A1 | * | 11/2003 | Stern et al. | 709/329 |
| 2004/0001094 | A1 | * | 1/2004 | Unnewehr et al. | 345/769 |
| 2004/0054428 | A1 | * | 3/2004 | Sheha et al. | 700/56 |
| 2004/0095390 | A1 | * | 5/2004 | Arning et al. | 345/769 |
| 2004/0150664 | A1 | * | 8/2004 | Baudisch | 345/740 |
| 2005/0060653 | A1 | * | 3/2005 | Fukase et al. | 715/724 |
| 2006/0005164 | A1 | * | 1/2006 | Jetter et al. | 717/113 |
| 2006/0070007 | A1 | * | 3/2006 | Cummins et al. | 715/769 |
| 2006/0136833 | A1 | * | 6/2006 | Dettinger et al. | 715/769 |

(Continued)

OTHER PUBLICATIONS

Baudisch, Drag-and-Drop and Drag-and-Pick, Aug. 2003.*

(Continued)

*Primary Examiner* — Tadeese Hailu
(74) *Attorney, Agent, or Firm* — Weaver Austin Villeneuve & Sampson LLP

(57) ABSTRACT

Methods and apparatus are described for manipulating objects in a user interface. The user interface includes a first interface object operable to be selected and moved within the user interface. In response to selection and movement of the first interface object in the user interface, at least one additional interface object is presented in the user interface in proximity of the first interface object. Each additional interface object represents a drop target with which the first interface object may be associated.

34 Claims, 7 Drawing Sheets

(56) References Cited

U.S. PATENT DOCUMENTS

2007/0016872 A1* 1/2007 Cummins et al. ............. 715/769
2007/0033169 A1* 2/2007 Friedman .......................... 707/3
2007/0150834 A1* 6/2007 Muller et al. ................. 715/810

OTHER PUBLICATIONS

Collomb, Improving drag-and-drop on wall-sized displays, Canadian Information Processing Society, May 2005.*

* cited by examiner

FIG. 4

SMART DRAG-AND-DROP

BACKGROUND OF THE INVENTION

The present invention relates to techniques for manipulating objects in user interfaces and, more specifically, to techniques for enhancing "drag-and-drop" functionality in such interfaces.

The ability to select and move, i.e., "drag-and-drop," objects in a user interface has been around for some time. Recently, there has been a resurgence of interest in this functionality with software developers making it available in a variety of computing contexts including, for example, web applications. However, while it is a popular and intuitively appealing feature for users, drag-and-drop has its shortcomings.

For example, dragging an object to a "drop target" (i.e., another object with which the user wishes to associate the first object) in a remote part of the interface can often require multiple gestures with the relevant control device (e.g., mouse or touchpad); an awkward and often irritating process. When the desired drop target is part of a list and is currently off screen, the user must wait and hold the object while the list slowly scrolls to the target. In addition, the relatively small size of some drop targets and their proximity to other drop targets increase the likelihood that a dragged object may be dropped on the wrong target. These issues are exacerbated further by today's increasingly larger displays.

It is therefore desirable to provide mechanisms which improve the usability of the drag-and-drop functionality.

SUMMARY OF THE INVENTION

According to the present invention, methods and apparatus are provided for manipulating objects in a user interface. The user interface includes a first interface object operable to be selected and moved within the user interface. In response to selection and movement of the first interface object in the user interface, at least one additional interface object is presented in the user interface in proximity of the first interface object. Each additional interface object represents a drop target with which the first interface object may be associated.

A further understanding of the nature and advantages of the present invention may be realized by reference to the remaining portions of the specification and the drawings.

BRIEF DESCRIPTION OF THE DRAWINGS

FIGS. 4 and 5 are representations of an electronic mail application user interface environment illustrating operation of a specific embodiment of the invention.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Figure 1:
FIGS. 1-3 are representations of a personal computer "desktop" user interface environment illustrating operation of a specific embodiment of the invention.
Figure 2:

According to the present invention, enhanced "drag-and-drop" experiences are provided which increase the usability of the drag-and-drop functionality. According to specific embodiments, various types of intelligence are built into the drag-and-drop functionality to make drop target options more accessible to the user. An exemplary embodiment of the present invention is illustrated in FIGS. 1 and 2. FIG. 1 is a simplified representation of a desktop environment on a computing platform such as, for example, a personal or laptop computer. In the upper left hand corner of interface 100 is an object 102 entitled Word.doc which represents a word processing document. In the lower right hand corner of interface 100 is another object 104 representing the computer's recycle bin, i.e., a file system location for discarding files. The operation of moving Word.doc 102 to Recycle bin 104 will be described to illustrate a specific embodiment of the invention.

Using any tool which is conventionally operable to manipulate objects in a user interface, e.g., a mouse, a touchpad, a touch screen, stylus-enabled screen, etc., a user selects Word.doc 102 and begins to drag or move the object toward Recycle bin 104 according to any conventional drag-and-drop protocol. In response to the dragging of the object and as shown in FIG. 2, drop targets are presented in interface 100 in proximity to the dragged object. Recycle bin 106 is an alternate instantiation of Recycle bin 104. Another target object 108 entitled "Send to . . . " links to an electronic mail application and enables the user to attach Word.doc 102 to an electronic mail message. A third target object 110 entitled "My Documents" allows the user to move Word.doc 102 to the corresponding location in the computer's file system.

According to specific embodiments, this "smart" drag-and-drop functionality anticipates what the user is attempting to do with reference to the movement of the object being dragged, e.g., the velocity and/or direction. According to some embodiments, an event handler is employed which is responsive to the drag-and-drop event, and which may have include additional logic which is responsive to a variety of parameters including, for example, the type of object being dragged. At some point after the event handler detects a dragging event, the drop targets are presented in accordance with the event handler logic.

According to some embodiments, the drop targets could be presented substantially immediately, i.e., in response to detection of the event itself. Alternatively, a delay may be introduced which could be based on other parameters such as, for example, the distance the object has been dragged, the amount of time the object has been dragged, e.g., the drop targets might not be presented until the object has been dragged a certain distance in the interface or for a predetermined period of time. The event handler logic could also decide whether to present the drop targets at all depending on parameters associated with the drag-and-drop event or the dragged object. For example, if the initial position of the dragged object is close to an edge of the interface, and that is the edge toward which the object is being dragged, the event handler may determine that the drop targets should not be presented.

As shown in FIG. 2, the drop targets may be arranged relative to the current position of the object being dragged. The arrangement may be in a line as shown, the orientation of which could depend, for example, on the direction of the dragging, e.g., 90 degrees to the line of dragging. Alternatively, the drop targets could be arranged in an arc or circle centered around the current position of the object being dragged. According to some embodiments, the configuration and position(s) of the drop targets in the interface may be determined with reference to the movement of the dragged object. For example, based on the speed and direction of the movement, the drop targets may be positioned far enough away to ensure that the user doesn't overshoot them, but close enough to make the presentation useful.

According to yet another alternative (an example of which is described below), the drop targets may be presented as a list of menu items. According to some such embodiments, the position of the list in the interface may also depend on some parameter relating to the dragged object, e.g., direction or speed. In some cases, only a single drop target might be presented.

According to specific embodiments, the drop targets persist while the object is being dragged. If the user cancels the drag operation (e.g., by releasing the mouse button), the drop targets disappear. In a particular implementation, if the user drags the object past the drop targets (indicating that none are the desired target), they may also disappear.

According to various embodiments, drop targets presented according to the invention may allow branching, i.e., the presentation of further drop target options relating to one of the options presented. According to a specific embodiment, when the user causes the dragged object to hover over such a branching drop target, any other drop targets originally presented with that drop target may disappear, and a new set of drop targets appears which is related to the drop target over which the dragged object is positioned. For example, where the original drop target selected by the user represents a folder in a file system, the new drop targets could represent subfolders within that folder. This could be an iterative process which facilitates navigation through the file system.

Figure 3:

In another example shown of such "drilling down" shown in FIG. 3, when the user causes the dragged object to hover over drop target 108, an additional set of drop targets (302, 304, and 306) is presented which represent specific contacts to whom the user may send the object. Dropping the object on one of those targets could then launch the messaging interface with the recipient field populated with the corresponding contact information, or even result in the object automatically being sent to the corresponding contact.

As will be understood, the appearance, number, position, and configuration of the virtual drop targets may vary considerably without departing from the scope of the invention. The manner in which drop targets are instantiated or otherwise made to appear may be governed by a wide variety of techniques including, for example, proprietary methods associated with the event handler logic, or the calling predefined instantiation methods (e.g., such as may be associated with an operating system, or an application into which the functionality of the present invention is integrated).

The nature of the drop targets and what they represent, as well as what is precipitated by associating a dragged object with a drop target may vary considerably as well. According to various embodiments, and as mentioned above, drop targets may represent locations in a file system. By associating a dragged object with such a drop target, the information or file represented by the dragged object may be moved or copied to the corresponding file system location.

In another example, a drop target may represent an application which uses or processes the dragged object and/or the information it represents. For example, as illustrated above, the drop target can represent a messaging application. When the dragged object is "dropped" on or associated with the drop target, the messaging application launches a message creation interface for creating a message (e.g., an email or instant message) to which the file represented by the dragged object may be attached. As discussed above, drop targets can represent contacts to whom a dragged object is to be sent or otherwise made available. Drop targets may also represent commands relating to the handling of the dragged object, e.g., delete, forward, open, etc. More generally, any type of drop target with which an object in a user interface may be associated or which may employ the information represented by such an object may be presented according to the present invention.

The set of drop target options presented to the user may also be determined in a wide variety of ways. According to some embodiments, at least some of the drop targets are determined with reference to drop targets already open or represented in the interface. For example, as shown in the desktop interface example of FIGS. 1 and 2, drop target 106 corresponds to Recycle bin 104 which was already present on the desktop when the dragging operation commenced. Another example of a preexisting drop target is an open window which may correspond, for example, to a currently running application or a file system folder.

Drop targets may also be determined with reference to the file type associated with the dragged object. That is, for example, as shown in FIGS. 1 and 2, if the dragged object corresponds to a particular file type, e.g., a word processing file, one of the drop targets presented can be the default file system folder for that file type, e.g., My Documents folder 110. Similarly, if the dragged object corresponds to an mp3 file or a jpeg file, a "My Music" or "My Photos" folder could be presented. According to some embodiments, the available drop target options are limited to drop targets with which the dragged object may be associated. That is, if the dragged object corresponds to a particular file type or application, or a potential drop target has some associated restrictions, such options will not be presented even if, for example, they may already be present in the interface.

According to a specific embodiments, drop target options may be determined with reference to parameters associated with the dragging event from which possible targets are inferred. Such parameters might include, but are not limited to, the speed and/or direction of the dragging, the initial position of the dragged object in the interface, the positions of preexisting drop targets in the interface, etc. For example, if the current trajectory of the dragged object is moving the dragged object toward a preexisting drop target in the interface, e.g., Recycle bin 104, a corresponding drop target option, e.g., Recycle bin 106, is presented closer to the dragged object. By contrast, if there is another preexisting object in the interface in the opposite direction of the dragging, that object might not be presented as a drop target option. Similarly, if the speed of the dragging is sufficiently high, potential drop targets which are already relatively close to the dragged object may not be presented in response to the dragging event in favor of objects which are farther away.

Drop targets presented according to the present invention may also be determined with reference to user preferences. That is, the user may be allowed to specify one or more drop targets he would like to appear for drop-and-drag events and/or file types. According to specific embodiments, the user may specify that certain targets appear for all such events. In addition, the user may be able to specify when certain targets appear on a more granular level. For example, the user can specify specific folders as drop targets for particular file types, e.g., the "My Music" folder, or a shortcut to a favorite media player for music files.

Drop targets may also be determined with reference to user behavior while interacting with the user interface. For example, data relating to the frequency of use of particular drop targets could be maintained over time and used to determine a set of drop targets which could continue to evolve over time with the user's habits. As with the examples discussed above, different sets of drop targets may be presented based on other criteria in combination with these data.

That is, as will be understood, various combinations of the foregoing and other criteria may be used to determine the appropriate drop targets to present to the user. For example, even though a user might identify drop target preferences, the determination of which drop targets to present could still be governed by restrictions relating to whether or not a particular dragged object can "legally" be associated with particular targets. In another example, drop targets may be selected from targets currently present in the interface based on the file type of the dragged object. Other combinations of these criteria as well as a wide variety of criteria not set forth in this description may be employed without departing from the scope of the invention.

Some further examples of specific embodiments will now be described with reference to FIGS. 4-6.

Figure 4:
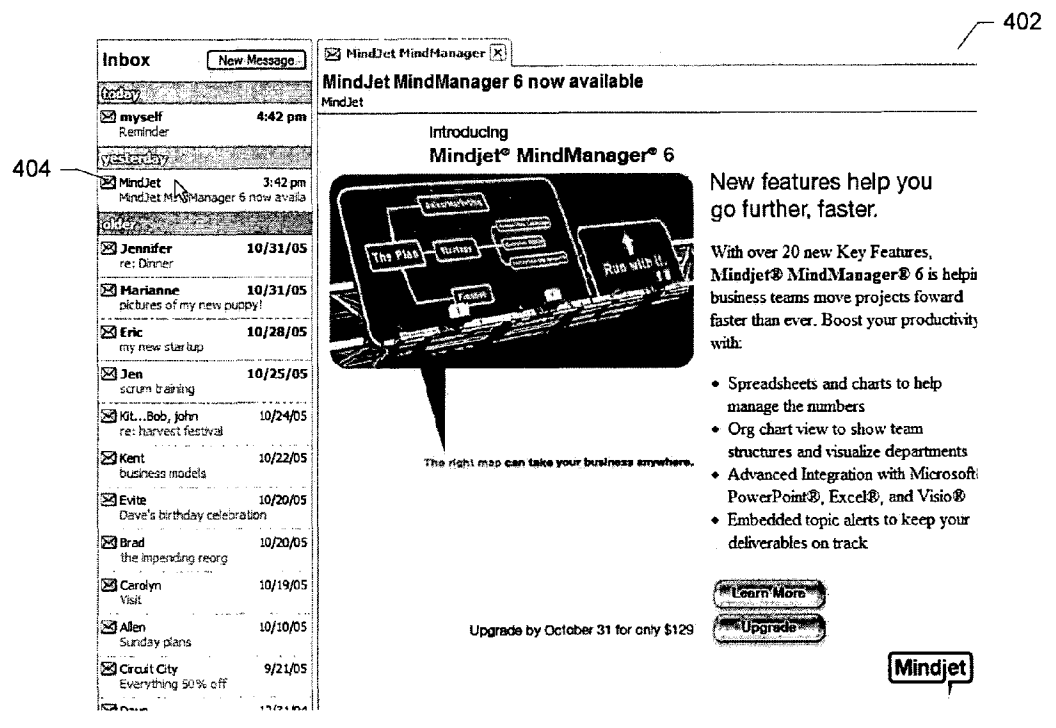
Figure 5:
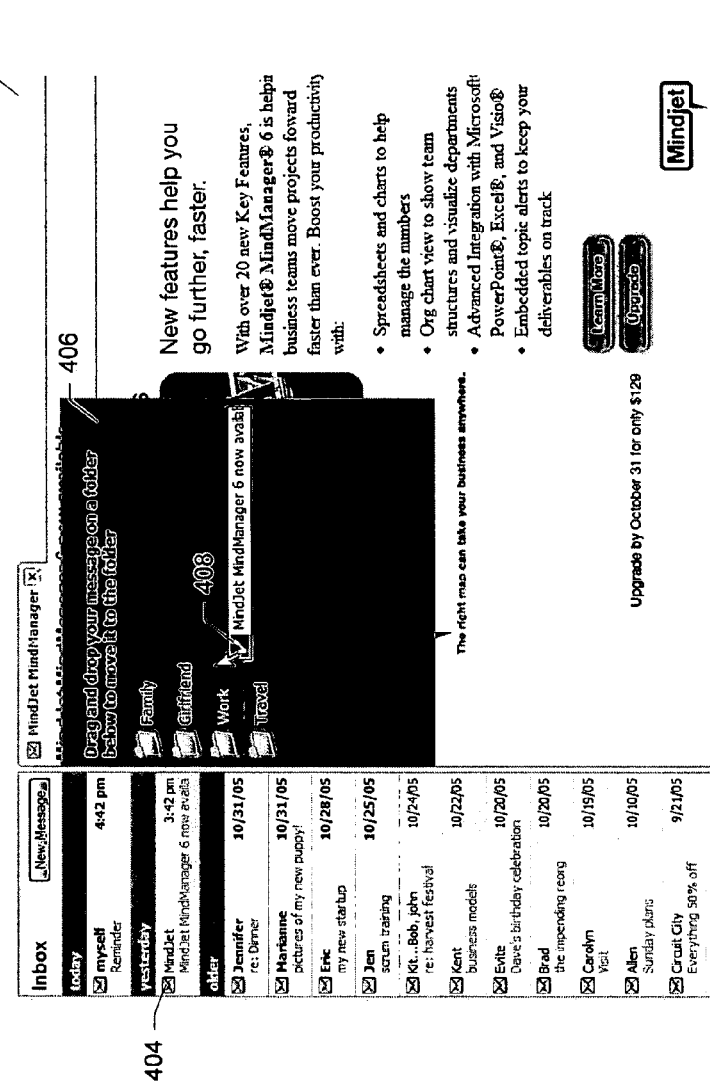

FIGS. 4 and 5 show an exemplary electronic mail application interface 402 in which a specific embodiment of the invention may be implemented. In response to selection and dragging of a particular mail message (e.g., message 404), potential drop targets for the selected message are presented in a list 406 as shown in FIG. 5. In contrast with the configuration shown in FIGS. 2 and 3, the drop target options are arranged in a vertical list similar to a drop down menu. One advantage of such an approach is that the list of options remains hidden until actually needed by the user to organize his messages. That is, the user does not need to have his list of mail folders open in the interface all the time, thus reducing interface clutter. As described above, the placement of the list, and the determination of what items should appear in the list may rely on a number of parameters.

And as described above, the drop target options may be limited to targets with which the dragged object may be associated. Alternatively and according to some embodiments, whether or not the dragged object may be associated with a particular drop target may be indicated during the dragging operation. For example, in the implementation illustrated in FIGS. 4 and 5, the dragged object has an indicator 408 associated with it while being dragged which indicates whether the object may be dropped at its current location. Thus, for example, because the mail message corresponding to the dragged object may be placed in the "Work" folder, a check mark is display indicating that the operation is allowed. If the operation is not allowed (e.g., the dragged object is not currently over an allowable drop target), a different symbol would be presented, e.g., circle with a diagonal slash. Other attributes (e.g., green vs. red) could also be used to represent such information.

Figure 6:
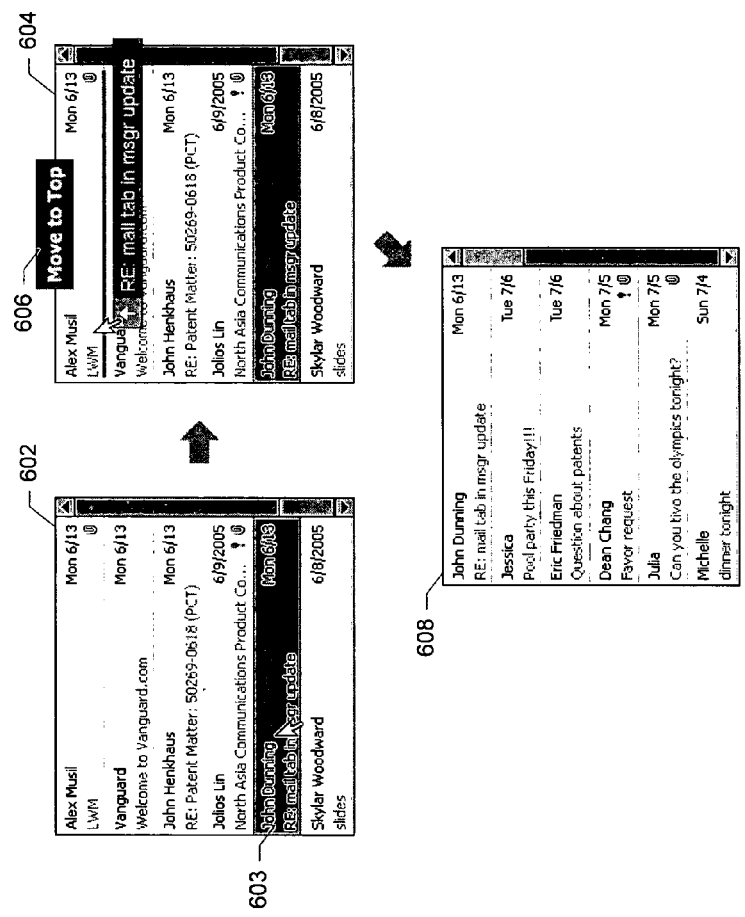
FIG. 6 includes representations of a list in a user interface environment in which a specific embodiment of the invention may be implemented.

According to yet another implementation illustrated in FIG. 6, the present invention is used to facilitate reordering of a list. A list of messages is shown but, as will be understood, any type of list in any type of application and/or interface could be reordered according to this embodiment of the invention. In the first screen 602, a relatively small portion of a much longer list of messages is shown. The user selects a particular object 603 (i.e., corresponding to the message entitled "RE: mail tab in msgr update"), and begins a drag-and-drop operation by dragging the object up the list. In screen 604 and in response to the drag-and-drop operation, a drop target 606 entitled "Move to Top" is instantiated which is operable to move the dragged object to the top of the list if the object is dropped on the target as illustrated in screen 608. This is to be contrasted with a conventional drag-and-drop operation which would require that the user wait until the entire list scrolls all the way to the top. According to various embodiments, the user might be presented with other drop target options to facilitate the reordering. For example, the bottom of the list and/or intermediate locations in the list in the direction of scrolling could be presented.

As will be appreciated, the various functionalities described herein may be implemented in a wide variety of computing contexts. For example, as illustrated in FIGS. 1-3, the invention may be part of an operating system. The invention may also be implemented in a client application such as, for example, an electronic mail application. Embodiments of the invention may also be implemented in a web application. According to a specific embodiment, the drag-and-drop functionality described herein is implemented as a JavaScript library that any web application can use.

And regardless of the context in which the invention is implemented, the logic employed to control the enhanced drag-and-drop functionalities enabled by the invention may be designed to suit the particular application. For example, in some contexts (e.g., a desktop environment) it might be appropriate for most or all objects in the interface to be drag-and-drop enabled according to the invention. However, in other contexts (e.g., a messaging application) it might only be appropriate for a limited subset of objects in the interface to be so enabled.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing models in which various of the functionalities described herein may be effected or employed at different locations.

Figure 7:
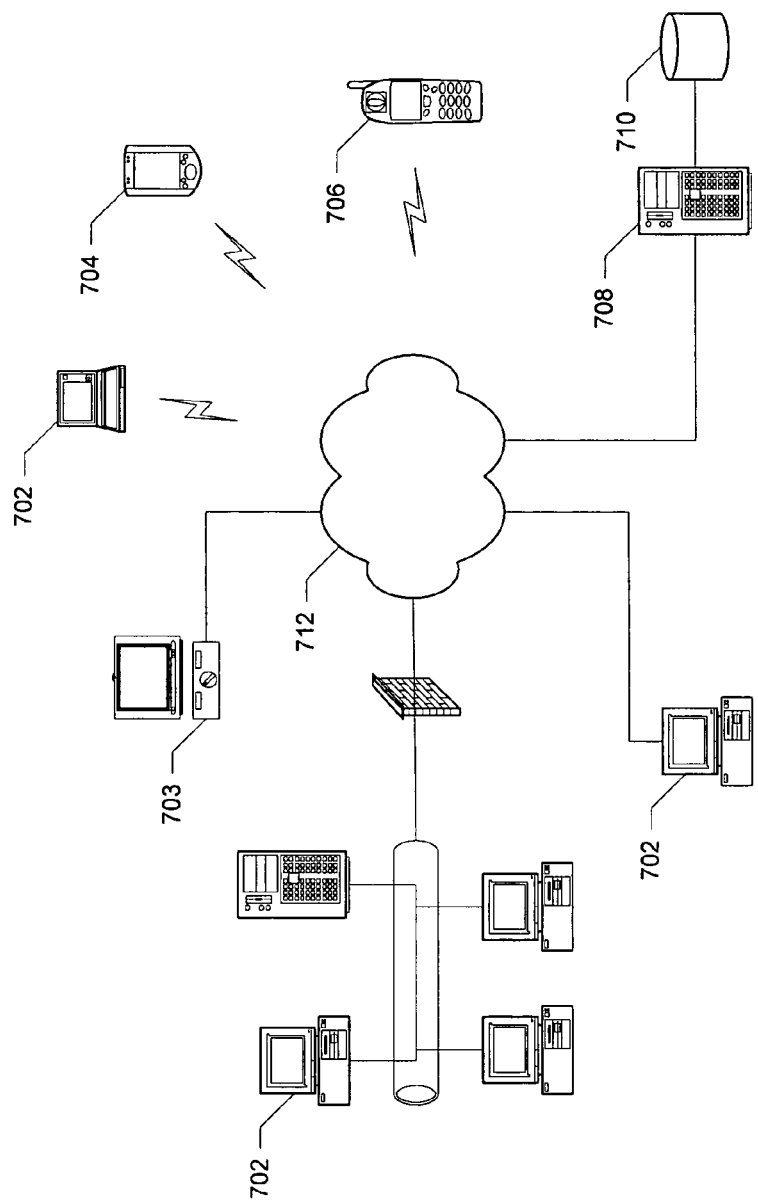
FIG. 7 is an exemplary network diagram illustrating various computing contexts in which various embodiments of the invention may be implemented.

It should also be noted that the present invention may be implemented on any computing platform and in any network topology in which drag-and-drop is used or may be useful. For example and as illustrated in FIG. 7, implementations are contemplated in which the enhanced drag-and-drop functionalities described herein are employed on any type of personal computer (e.g., desktop, laptop, tablet, etc.) 702, media computing platforms 703 (e.g., cable and satellite set top boxes and digital video recorders with navigation and recording capabilities), handheld computing devices (e.g., PDAs) 704, cell phones 706, or any other type of portable communication platform. As discussed above, the code enabling drag-and-drop functionality according to the invention may be resident on such devices, e.g., as part of an operating system or other application (e.g., a browser), or be served up from a remote site, e.g., in a web application (represented by server 708 and data store 710). The invention may also be practiced in a wide variety of network environments (represented by network 712), e.g., TCP/IP-based networks, telecommunications networks, wireless networks, etc.

While the invention has been particularly shown and described with reference to specific embodiments thereof, it will be understood by those skilled in the art that changes in the form and details of the disclosed embodiments may be made without departing from the spirit or scope of the invention. For example, the present invention is not limited to the presentation of conventional drop targets. According to a particular embodiment, a list of drop targets may be presented in response to a dragging event which corresponds to the "right click options" corresponding to the dragged object. As is well known to more sophisticated users, selecting an object on a personal computer desktop with the right mouse button results in a menu of available options for the selected object, e.g., Open, Send to, Cut, Copy, Create Shortcut, etc. Enabling access to these options in response to a dragging event would make them more easily discoverable to novice users, as well as enable presentation of such options for devices not having the equivalent of a second mouse button.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for manipulating objects in a user interface, comprising:
   providing the user interface including a first interface object operable to be selected and moved within the user interface; and
   in response to selection and movement of the first interface object in the user interface, presenting a first set of at least one additional interface object in the user interface in proximity of the first interface object, each additional interface object representing a drop target with which the first interface object may be associated;
   wherein when the first interface object is dragged such that it hovers over one of the at least one additional interface object, presenting a second set of two or more additional interface objects that is related to the additional interface object over which the first interface object is positioned;
   wherein prior to presenting the second set of two or more additional interface objects, identifying the second set of two or more additional interface objects with reference to a user preference;
   wherein the first interface object can be dropped on one of the second set of two or more additional interface objects.

2. The method of claim 1 wherein the first interface object represents a message, wherein the user interface is associated with a messaging application.

3. The computer-implemented method of claim 2, wherein the second set of two or more additional interface objects comprises an interface object corresponding to a "Send To" option, thereby enabling access to the "Send To" option in response to the dragging of the first interface object.

4. The computer-implemented method of claim 2, wherein when the first interface object is dropped on or associated with one of the second set of two or more additional interface objects, the messaging application launches a message creation interface for creating a message to which a file represented by the first interface object is to be attached.

5. The computer-implemented method of claim 4, wherein the second set of two or more additional interface objects represent contacts to whom the first interface object is to be sent.

6. The computer-implemented method of claim 4, wherein the second set of two or more additional interface objects represent commands relating to handling of the first interface object.

7. The computer-implemented method of claim 6, wherein the commands comprise at least one of delete, forward or open.

8. The method of claim 1 wherein each additional interface object corresponds to a current interface object present in the user interface prior to the selection and movement of the first interface object, each current interface object representing the drop target to which the corresponding additional interface object corresponds.

9. The method of claim 8 wherein the at least one additional interface object is presented closer to the first interface object than the corresponding current interface object.

10. The method of claim 9 wherein the at least one additional interface object is presented in the user interface simultaneously with the corresponding current interface object.

11. The method of claim 1 further comprising facilitating association of the first interface object with the drop target represented by a selected one of the set of two or more additional interface objects.

12. The method of claim 11 wherein facilitating association of the first interface object with the drop target represented by the selected additional interface object comprises associating the first interface object with the drop target in response to the first interface object being dragged over and dropped on the selected additional interface object.

13. The method of claim 11 wherein the drop target corresponds to a first portion of a file system, and wherein facilitating association of the first interface object with the drop target represented by the selected additional interface object comprises associating the first interface element with the first portion of the file system.

14. The method of claim 13 further comprising facilitating navigation of a second portion of the file system related to the first portion of the file system by presenting at least one further additional interface object representing at least one further drop target associated with the second portion of the file system.

15. The method of claim 1 wherein the user interface is provided on a display associated with any of a personal computer, a media computing platform, a wireless device, a telecommunications device, and a handheld computing device.

16. The method of claim 1 wherein the user interface is associated with a web application.

17. The method of claim 1, wherein if the first interface object is not dropped on one of the second set of one or more additional interface objects, the second set of one or more additional interface objects are no longer presented.

18. The method of claim 1, wherein the second set of one or more additional interface objects are child interface objects of the one of the at least one additional interface object.

19. The method of claim 18, wherein the one of the at least one additional interface objects is a folder, and wherein the second set of one or more additional interface objects represent sub-folders of the one of the at least one additional interface object.

20. The method of claim 19, wherein the first interface object is a file.

21. The method of claim 19, wherein each of the sub-folders correspond to a different file type.

22. The computer-implemented method of claim 1, wherein the second set of two or more additional interface objects are folders.

23. The computer-implemented method of claim 1, wherein the first interface object and each of the second set of two or more additional interface objects is drag-and-drop enabled.

24. A device comprising a processor, memory, and a display, the processor and memory being configured for performing operations, comprising:
   providing the user interface including a first interface object operable to be selected and moved within the user interface; and
   in response to selection and movement of the first interface object in the user interface, presenting a first set of at least one additional interface object in the user interface in proximity of the first interface object, each additional interface object representing a drop target with which the first interface object may be associated;
   wherein when the first interface object is dragged such that it hovers over one of the at least one additional interface object, presenting a second set of one or more additional interface objects that is related to the additional interface object over which the first interface object is positioned;
   wherein the first interface object can be dropped on one of the second set of one or more additional interface objects;
   wherein prior to presenting the second set of one or more additional interface objects, identifying the second set of one or more additional interface objects based, at least in part, on a speed of movement of the first interface object in the user interface.

25. The computer-implemented method of claim 24, wherein the second set of two or more additional interface objects are folders.

26. A computer-implemented method for manipulating objects in a user interface, comprising:
   providing the user interface including a first interface object operable to be selected and moved within the user interface; and
   in response to selection and movement of the first interface object in the user interface, presenting a plurality of additional interface objects in the user interface in proximity of the first interface object, each of the plurality of additional interface objects representing a drop target with which the first interface object may be associated;
   wherein presenting the plurality of additional interface objects in the user interface in proximity of the first interface object includes:
      determining a configuration in which to present the plurality of additional interface objects, the configuration being relative to the first interface object, wherein the configuration in which to present the plurality of additional interface objects is determined based, at least in part, on a total number of interface objects in the plurality of additional interface objects and a speed of movement of the first interface object in the user interface;
      presenting the plurality of additional interface objects in the configuration relative to the first interface object.

27. The computer-implemented method of claim 26, wherein an orientation of the configuration further depends, at least in part, upon a direction of the movement of the first interface object.

28. The computer-implemented method of claim 26, wherein the configuration comprises an arc or circle.

29. The computer-implemented method of claim 28, wherein the arc or circle is centered around a current position of the first interface object.

30. The computer-implemented method of claim 26, wherein the configuration is centered around a current position of the first interface object.

31. A device comprising a processor, memory, and a display, the processor and memory being configured for performing operations, comprising:
   providing the user interface including a first interface object operable to be selected and moved within the user interface; and
   in response to selection and movement of the first interface object in the user interface, presenting a plurality of additional interface objects in the user interface in proximity of the first interface object, each of the plurality of additional interface objects representing a drop target with which the first interface object may be associated;
   wherein presenting the plurality of additional interface objects in the user interface in proximity of the first interface object includes:
      determining a configuration in which to present the plurality of additional interface objects, the configuration being relative to the first interface object, wherein the configuration in which to present the plurality of additional interface objects is determined based, at least in part, on a total number of interface objects in the plurality of additional interface objects and a speed of movement of the first interface object in the user interface; and
      presenting the plurality of additional interface objects in the configuration relative to the first interface object.

32. The device of claim 31 wherein the device comprises one of a personal computer, a media computing platform, a wireless device, a telecommunications device, and a handheld computing device.

33. The device of claim 31 wherein the user interface is associated with a messaging application.

34. A computer program product comprising at least one non-transitory computer-readable medium having computer program instructions stored therein, comprising:
   instructions for providing the user interface including a first interface object operable to be selected and moved within the user interface; and
   instructions for presenting a first set of at least one additional interface object in the user interface in proximity of the first interface object in response to selection and movement of the first interface object in the user interface, each additional interface object representing a drop target with which the first interface object may be associated;
   instructions for presenting a second set of two or more additional interface objects that is related to the additional interface object over which the first interface object is positioned when the first interface object is dragged such that it hovers over one of the at least one additional interface object; and
   instructions for identifying the second set of two or more additional interface objects with reference to a user preference prior to presenting the second set of two or more additional interface objects;
   wherein the first interface object can be dropped on one of the second set of two or more additional interface objects.

* * * * *